(12) United States Patent  
Travis

(10) Patent No.: US 7,976,208 B2
(45) Date of Patent: Jul. 12, 2011

(54) FLAT PANEL LENS

(75) Inventor: Adrian R. L. Travis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 11/815,474

(22) PCT Filed: Feb. 6, 2006

(86) PCT No.: PCT/GB2006/000420
§ 371 (c)(1),
(2), (4) Date: Mar. 20, 2008

(87) PCT Pub. No.: WO2006/082444
PCT Pub. Date: Aug. 10, 2006

(65) Prior Publication Data
US 2008/0316768 A1 Dec. 25, 2008

(30) Foreign Application Priority Data
Feb. 5, 2005 (GB) .................................. 0502453.4

(51) Int. Cl.
*F21V 7/04* (2006.01)
(52) U.S. Cl. .......... 362/610; 362/26; 362/615; 362/616; 362/617; 362/628; 385/901
(58) Field of Classification Search .................. 362/615, 362/617, 351, 26, 610, 616, 628; 385/901
See application file for complete search history.

(56) References Cited

U.S. PATENT DOCUMENTS

| 5,625,736 | A | 4/1997 | Veligdan |
| 2001/0053075 | A1 | 12/2001 | Parker et al. |
| 2003/0147232 | A1 | 8/2003 | Kraft |
| 2004/0042196 | A1 | 3/2004 | Kraft |
| 2005/0007753 | A1 * | 1/2005 | Van Hees et al. ............... 362/31 |

FOREIGN PATENT DOCUMENTS

JP 2002277873 9/2002
(Continued)

OTHER PUBLICATIONS

Travis, et al. "P:127 Linearity in Flat Panel Wedge Projection", SID 03 Digest, pp. 716-719 (Copyright 2003).

(Continued)

*Primary Examiner* — Stephen F Husar

(57) ABSTRACT

A light guide with input and output faces 2, 3a is polar-symmetric about the first face 2 and has optical properties such that the angle at which a ray is injected into the first face determines the position at which it leaves the second face 3a, or, if operated in the reverse direction, the position at which the ray enters the second face determines the angle at which the ray leaves the second face. The light guide includes a tapered transparent sheet 3, light from the first face entering at the thick end of this sheet, and the second face forming one face of the tapered sheet. An input/output slab 4 adjoins the tapered sheet 3 for fan-out of light from the first face 2 to the tapered sheet, and a transition region 8 is located between flat and tapered sheets. The polar symmetry means that light rays always travel in line with the taper direction, which suppresses banding. Preferably the light guide further includes a prism device 20 for folding the light so that the flat and tapered sheets can be folded over each other. A method of making such a prism is also disclosed.

19 Claims, 3 Drawing Sheets

FOREIGN PATENT DOCUMENTS

| | | |
|---|---|---|
| JP | 2004038108 | 2/2004 |
| JP | 2004069751 | 3/2004 |
| JP | 2004158336 | 6/2004 |
| WO | WO 01/72037 A1 | 9/2001 |
| WO | WO 02/45413 A1 | 6/2002 |
| WO | WO 03/013151 A2 | 2/2003 |

OTHER PUBLICATIONS

International Search Report issued in priority application PCT/GB006/000420 (Aug. 11, 2006).

Written Opinion issued in priority application PCT/GB006/000420 (Aug. 11, 2006).

"Third Office Action", Chinese Appln No. 200680003953.7, (Aug. 28, 2009), 9 pages.

"Foreign Office Action", EP Application No. 06709664.4, (Feb. 11, 2011), 4 pages.

"Foreign Office Action", Japanese Application No. 2007-553707, (Apr. 26, 2011), 6 pages.

* cited by examiner

FLAT PANEL LENS

This invention is concerned with lenses in general and aims largely to eliminate the space normally required between a lens and its focal point.

FIELD OF THE INVENTION

Lenses are commonly used to focus collimated light to a point, as in cameras, or to collimate light emerging from a point, as in car headlights. The focal point is some distance behind the lens, and space is required in order to allow rays from the point to fan out to the lens diameter or vice versa. This makes conventional optical systems bulky.

An example of this problem is in the design of rear-projection televisions, which are less expensive than plasma displays or liquid crystal displays, but are bulky. WO 01/72037 describes how to make a thin projection display by pointing a video projector into the thick end of a wedge-shaped light-guide. The light is totally internally reflected between the two faces of the wedge as it travels towards the sharp end, bouncing at progressively steeper angles. At a certain point TIR no longer occurs and the light exits. The greater the difference between the injection angle of a ray and the critical angle, the more times the ray must reflect off the faces of the guide, and hence the further towards the thin end it travels, before it emerges. The angle of injection therefore determines how far a ray is from the point of input when it emerges from the face of the guide, so that a magnified version of the projected image appears on the face of the guide.

The path of a ray is reversible, so the display described above can work in reverse as a flat-panel camera, as described by WO 02/45413. Rays that hit the face of the guide at an appropriate angle will be guided towards the thick end by total internal reflection, and the angle at which the rays emerge from the thick end is determined by the position at which they enter the light-guide. Since the rays are approximately parallel as they enter the light-guide, a conventional camera pointed into the thick end of the light guide will capture a parallel projection of whatever is in front of the face of the guide.

Images can become banded as they pass through a tapered light-guide, because there may be a gap between parts of the image formed by rays that have bounced n times and those that have bounced n+1 times. WO 03/013151 describes how to shape the guide, rather than having a simple straight taper, so as to avoid banding. Rays emerging from a guide with this shape are approximately collimated so that it can be used as a crude flat panel lens; for example, if a spotlight is placed at the thick end of the light-guide then it can be used as a flat-panel headlight in a car. A problem with this shape is that it works less well with skew rays, i.e. with rays which have a component of direction perpendicular to both the light-guide's axis of taper and the normal to the faces of reflection, and if the degree of skew is large, the picture becomes banded. The degree of skew can be kept acceptable by keeping the fan-out angle of the injected light narrow, but this adds to the weight and thickness of the display. A second problem is that along an axis parallel to that in which the cross-section of the light guide is uniform, ejected rays have a component which is divergent, so the light is not truly collimated.

SUMMARY OF THE INVENTION

A flat-panel lens is therefore described here in which there is provided a tapered light guide which is polar-symmetric about the point of light injection, or light exit. Preferably it consists of a tapered output part, a flat, parallel-face slab-shaped input part for spreading the light from a point source over the width of the lens, and a transition part. These parts may all be integral. The input part (output for a camera-type apparatus) may be in the form of a sector, seen in plan, from a small end where a projector, light source or camera can be located, expanding to a wide part that matches the width (in plan) of the tapered waveguide. There should be a transition region between the two to avoid discontinuities. Preferably the input part is "folded" over the output to make the lens more compact. This can be done by a special prism whose thickness varies along its length to take account of the polar symmetry. The lens can be used in a projector, a lamp, a camera, or any other optical apparatus.

For a better understanding of the invention, embodiments will now be described by way of example with reference to the accompanying drawings, in which.

EMBODIMENTS OF THE INVENTION

Figure 1:
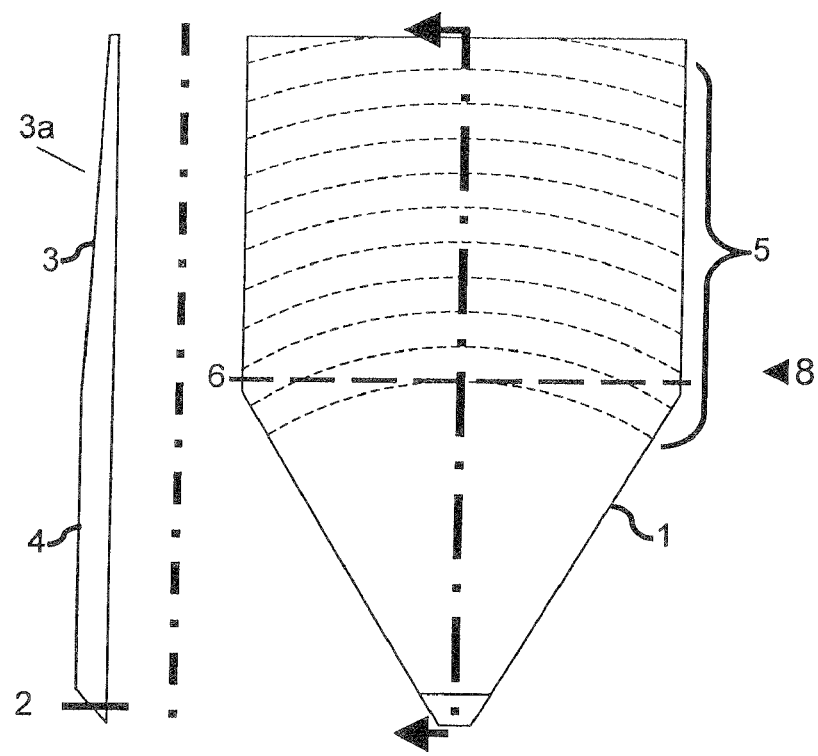
FIG. 1 shows the plan and profile of the tapered light-guide in its unfolded state, with contours of constant thickness denoted by dotted lines.

FIG. 1 shows a flat lens generally indicated at 1, consisting of a circular-sector-shaped input region 4 and a tapered output region 3. For use in reverse, e.g. in a camera, the roles of these two parts are reversed but for convenience "input" and "output" will be used as labels. Light is input (or output, depending on direction) at a point generally indicated at 2, which is a small beveled face on the tip of the input region 4. This region is a parallel-face slab which in plan has the shape of an isosceles triangle or circular sector. The output region 3 with its output face 3a adjoins this input region, having initially the same thickness, but tapers down, as shown in the sectional view, according to the radial distance r from the input point 2. This taper can be uniform, as described in WO 01/72037, or, preferably, of a profile such as to keep the total number of bounces constant, as described in WO 03/13151. Input and output regions 4 and 3 can be made of one piece of the same material, such as glass or acrylic, or can be separate pieces suitably joined.

In fact the output waveguide 3 need not be geometrically tapered provided that it has the effect of gradually increasing the angle of bounce of rays propagating in it. This can be achieved by GRIN techniques, for instance, in which the variation of refractive index achieves an "optical taper".

In order to avoid disruption of the image there should be a gradual transition from the flat or uniform input region 4 to the tapered output region 3. This transition region is indicated generally at 8.

Rays naturally fan out radially from a point source of light, so by making the tapered light-guide polar-symmetric about the point of light injection, as shown in FIG. 1 by arcs 5, rays never travel at an angle that is skewed to the axis of taper. The dotted lines can be taken to represent lines of equal thickness or contours. Some distortion is introduced by the polar symmetry, at least if a rectangular image is desired, but it can be cancelled by pre-distorting the projected image either optically or digitally.

Rays injected at input point 2 at various angles of incidence with respect to the plane of the lens 1 travel along the fan-out or input portion 4 by total internal reflection (TIR) until they reach the transition region 8, where the upper and lower faces of the lens or waveguide start to taper. The transition region 8 can be perhaps in the region of 5-10% of the total length of the waveguide. As they enter the tapered part 3 each bounce off a face is at a slightly steeper angle than the previous. Eventually the angle becomes too steep for TIR to happen and the light ray exits after travelling a distance on the plane that depends entirely on the original angle of injection: light originally injected more steeply exits nearer the input part 4, and light injected at a shallower angle exit nearer the far end, i.e. the thin end of the taper. For operation in reverse one can say that light entering at the thin end of the taper exits at the origin 2 at the shallowest angle.

Figure 2:
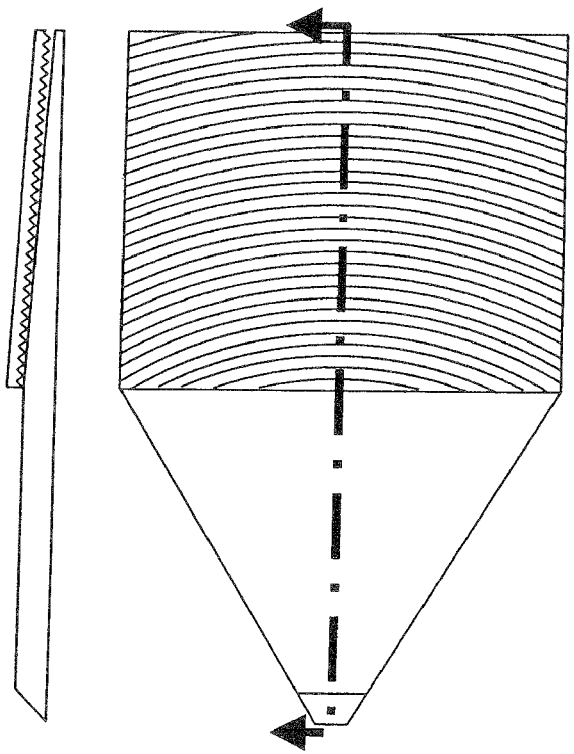
FIG. 2 shows how the plan and profile of the tapered light-guide in its unfolded state with polar-symmetric prismatic sheet.

When rays emerge from the polar-symmetric wedge they do not exit perpendicularly but diverge only slightly upwardly from the plane of the wedge and otherwise continue to radiate forwards from the point at which they were injected into the wedge. As shown in FIG. 2, prismatic film 10 is used to bend rays so that they are perpendicular to the screen, and with the polar-symmetric wedge the axis of the prisms must follow curves centered on the point of light injection, as shown in FIG. 2, if light is to be properly collimated. An alternative to prismatic film is holographic film configured to bend light through the same angle. This system also works backwards for use in a camera.

FIG. 2 also shows very schematically at 15 an optical device associated with the origin or first face 2. This device can be a simple light source acting as a point light source (e.g. an LED or laser device), a video or other image projector or, for camera applications, a miniature camera apparatus receiving light from the first face 2.

In practice one wishes for reasons of space to fold the apparatus so that the input region 4 is behind the output region 3, as described in WO 01/72037. This can be done by making the two slabs separate and "bending" the light round two 90° corners using rod-shaped prisms of triangular section. However, because the wedge is polar-symmetric, there is a curved boundary between the wedge-shaped waveguide on the one hand and the flat slab in which rays fan out to the width of the wedge. The prisms described in WO 01/72037 can fold only a slab with parallel sides, so the bottom of the curved boundary must be adjacent to the bottom of the wedge, and the space up to the top of the curved boundary will then form a blank margin beneath the displayed image, which is undesirable.

Figure 3:
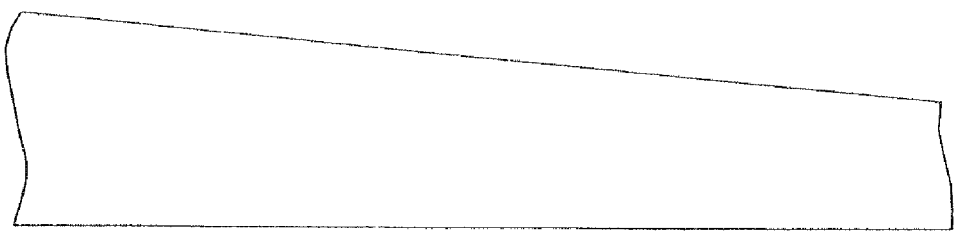
FIG. 3 shows how to fold a piece of paper with the cross section of a wedge.
Figure 3:
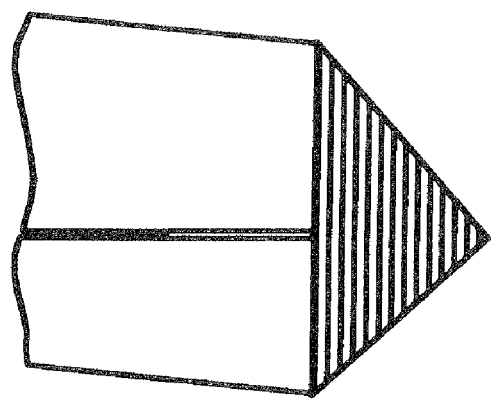
Figure 4:
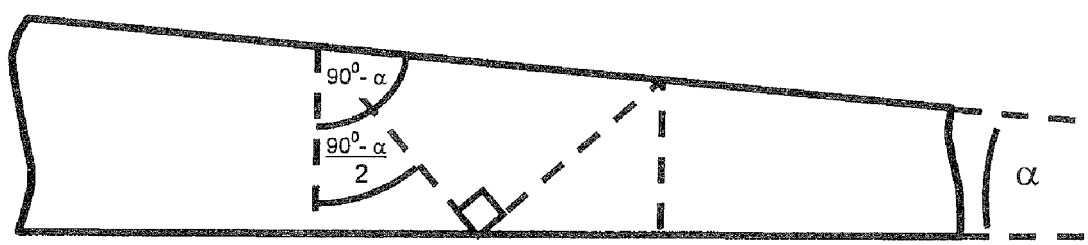
FIG. 4 shows how to design the angles for a pair of prisms to fold a tapered light-guide.
Figure 4:
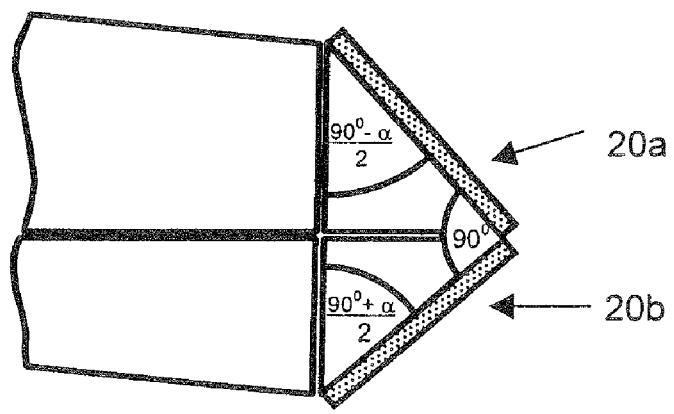
Figure 5:
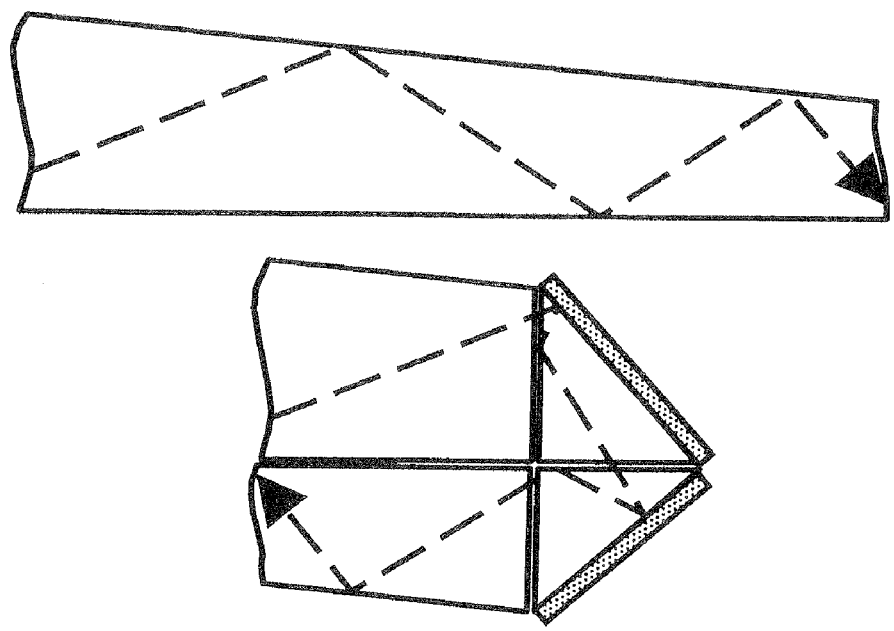
FIG. 5 shows the path of a ray round a folded tapered light-guide.

FIGS. 3, 4 and 5 show how to design prisms 20a, 20b which will fold a wedge-shaped light guide. Draw a wedge shape on a piece of paper which is blank on front and hashed on the rear, cut the shape out and it can be folded in the manner shown in FIG. 3. The hashed area defines the cross-section of two prisms which will fold light between the two halves of the wedge represented by the blank area. The boundary between the two folding prisms is an extension of the boundary between the two halves of the wedge.

FIG. 4 defines the design technique of FIG. 3 more precisely. Both folding prisms 20a, 20b are right-angled prisms and, if the wedge tapers at an angle α, then the remaining angles of the prisms should be (90°+α)/2 and (90°−α)/2 and the lengths of the sides of the prism should be designed so that there are no gaps or overlap.

FIG. 5 shows how a ray will travel round the curve of the folded prism in the same manner as for an unfolded wedge provided that the hypotenuse of the prisms is made reflective, the index of the prisms is sufficiently high and there is a low index layer between the prisms and (optionally) at the prism/wedge interfaces. The detailed index requirements are the same as for the folding prisms described in WO 01/72037.

The fold should be inserted at the bottom of the tapered section along a line 6 perpendicular to the axis of cross section shown in FIG. 1. The contours 5 of FIG. 1 demonstrate that the thickness of the tapered section 3 varies along the fold line 6. It follows that the thickness of the prisms should also vary.

The thickness, t, of an unfolded linear wedge varies as $t=t_0-\alpha r$, where $t_0$ is the starting thickness, a is the angle of wedge taper in radians, and r is the distance from the point of light injection. This formula can also be used as a reasonable approximation even for a shaped taper. If the wedge panel is cut along a straight line perpendicular to a distance $r_0$ from the point of light injection and z is the distance along that straight line from the point of maximum thickness, then:

$$r=\sqrt{r_0^2+z^2}$$

So:

$$t=t_0-\alpha\sqrt{r_0^2+z^2}$$

where t is the thickness along the exposed end of the cut wedge. The upper folding prism of FIG. 4 is placed to fit the end of the exposed wedge, so, while the cross-section of the folding prism should always be a triangle congruent to FIG. 4, the dimension or thickness of the prism cross-section varies with distance from its centre, z. The lower folding prism 20b is designed in the same way but with a larger value of $r_0$ appropriate to it replacing part of the wedge panel which is slightly further from the point of light injection.

Figure 6:
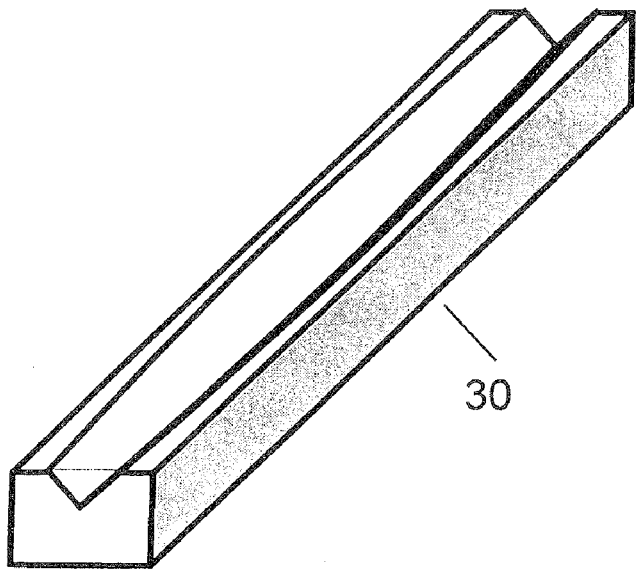
FIG. 6 shows a chuck which can be used to polish the variable-thickness folding prism needed to fold a polar-symmetric tapered light guide.

Such prisms can be made by polishing prisms with a uniform right-angled triangle cross-section, then bending the prisms either by suction or thermal sagging so that the right-angled edge fits into the groove of the chuck 30 shown in FIG. 6. A flat should then be polished on the exposed side, and if the groove has the appropriate variation in height then the released prism will have the required variation in thickness.

With a polar-symmetric profile, light injected from a point source at the thick end of the wedge panel emerges from the prismatic film in a single collimated direction. Furthermore, light rays incident on the wedge panel from this single direction are concentrated to a point. A wedge with a polar-symmetric profile can therefore perform many of the functions of a lens, with the advantage that collimation or focusing are achieved within a flat panel.

There has thus been desorbed a light guide with input and output faces 2, 3a is polar-symmetric about the first face 2 and has optical properties such that the angle at which a ray is injected into the first face determines the position at which it leaves the second face 3a, or, if operated in the reverse direction, the position at which the ray enters the second face determines the angle at which the ray leaves the second face. The light guide includes a tapered transparent sheet 3, light from the first face entering at the thick end of this sheet, and the second face forming one face of the tapered sheet. An input/output slab 4 adjoins the tapered sheet 3 for fan-out of light from the first face 2 to the tapered sheet, and a transition region 8 is located between flat and tapered sheets. The polar symmetry means that light rays always travel in line with the taper direction, which suppresses banding. Preferably the light guide further includes a prism device 20 for folding the light so that the flat and tapered sheets can be folded over each other.

I claim:

1. A flat light guide (1) comprising:
 a first face and second face acting as input and output parts (2, 3a) of the light guide, the first face (2) being small in relation to the total width of the light guide, the second face being formed by a tapered sheet (3) configured to taper down in thickness along the direction of travel of light that is input at the first face;
 an input slab (4) adjoining the tapered sheet and configured to cause light from a point of input at the first face to fan-out through the input slab to a thick end of the tapered sheet;
 wherein the light guide is configured to have optical properties such that the angle at which a ray is injected into the first face determines the position at which it leaves the second face (3a), or the position at which the ray enters the second face determines the angle at which the ray leaves the first face; in which the optical profile of the light guide is polar-symmetric about the first face (2), so that rays travelling along the light guide follow the local direction of taper.

2. A light guide as claimed in claim 1, wherein the first face (2) is in optical communication with the thick end of the tapered sheet.

3. A light guide as claimed in claim 2, wherein the input slab (4) adjoins the tapered sheet (3) to optically connect the first face (2) to the second face.

4. A light guide as claimed in claim 3 and including a transition region (8) between the input/slab and the tapered sheet.

5. A light guide as claimed in claim 3, further including a prism device (20) for folding the light so that the input slab and tapered sheet can be folded over each other.

6. A light guide according to claim 1, further including a light-redirecting sheet (10) configured to bend light perpendicularly relative to a direction of light travel within the tapered sheet.

7. An area light source comprising a light guide according to claim 1 and a point source (15) of light arranged to inject light into the first face (2) of the light guide.

8. A display comprising a light guide according to claim 1 and a projector (15) arranged to inject an image into the first face (2) of the light guide so that it can be seen over the second face (3a).

9. A camera apparatus comprising a light guide according to claim 1 and a small camera (15) arranged to receive light from the first face (2) of the light guide so as to form an image corresponding to a parallel image received at the second face (3a).

10. A light guide as claimed in claim 1, wherein the input slab has a uniform thickness.

11. A light guide as claimed in claim 1, wherein the light-redirecting sheet comprises a prismatic film.

12. A light guide as claimed in claim 1, wherein the light-redirecting sheet comprises a holographic film.

13. A light guide as claimed in claim 1, wherein the light guide is folded such that the input slab and the tapered sheet are folded over one another.

14. An optical device comprising:
 a light source and a display screen optically connected via a flat light guide (1), the flat light guide including:
 a first face and second face acting as input and output parts (2, 3a) of the light guide, the second face being formed by a tapered sheet configured to taper down in thickness along a direction of travel from the light source to the display screen;
 an input slab (4) adjoining the tapered sheet and configured to cause light from the light source input at the first face to fan-out through the input slab to a thick end of the tapered sheet;
 wherein the light guide is configured to have optical properties such that the angle at which a ray is injected from the light source into the first face determines the position at which it leaves the second face (3a).

15. An optical device as claimed in claim 14, wherein the light guide is folded such that the input slab and the tapered sheet are folded over one another.

16. An optical device as claimed in claim 15, further comprising a prism device configured based on a taper angle of the tapered sheet to enable light to travel from the input slab around the fold to the tapered sheet substantially as if the light guide was configured as an unfolded light guide.

17. An optical device as claimed in claim 14, further comprising a prismatic film arranged to bend light output at the second face so the light emerges perpendicular to the display screen.

18. An optical device as claimed in claim 14, wherein the optical device comprises a projector.

19. An optical device as claimed in claim 14, wherein the optical device comprises a flat-panel display.

* * * * *